Nov. 2, 1965 J. T. McNANEY 3,215,846
IMAGE AMPLIFYING APPARATUS
Filed Feb. 27, 1962
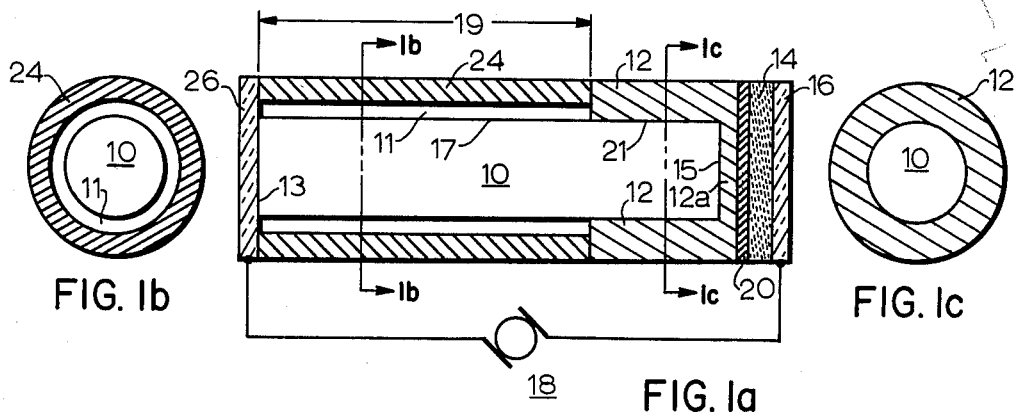
INVENTOR.
Joseph T. McNaney ated Nov. 2, 1965

3,215,846
IMAGE AMPLIFYING APPARATUS
Joseph T. McNaney, 8548 Boulder Drive,
La Mesa, Calif.
Filed Feb. 27, 1962, Ser. No. 175,983
3 Claims. (Cl. 250—213)

This invention relates to improvements in light amplifiers and particularly to amplifiers of light which uses a photoconductive layer in series with an electroluminescent phosphor layer. In such light amplifiers when the series combination is excited by an alternating voltage a low light level impinging on the photoconductor decreases its resistance sufficiently to cause a much larger light output from the phosphor.

Light amplifiers of this general type are well known in the art and it is equally known that the photoconductors used in them can be made sensitive to X-rays and infrared and thereby allowing these devices to be used for image conversion and intensification with these radiation sources. The chief difficulty found in such devices in the present state of the art has been poor resolution of images provided, which images were not better than 10,000 picture elements per square inch.

It is an object of the present improvements in light amplifiers to provide images of the light information received having picture resolutions exceeding one million elements per square inch.

Another object of this invention is to provide a light amplifier which is relatively simple in its construction and highly stable in its operation.

Still another object of this invention is to provide a light amplifier which lends itself to achieving relatively high gains in light amplification.

Further objects and advantages of the invention will become apparent from the following description when read in conjunction with the accompanying drawing in which:

FIGURE 1a is a sectional view of one embodiment of my invention utilizing a unitary light amplifier element, which is again sectionalized in FIGURES 1b and 1c.

Referring to the invention as illustrated in the drawing, I utilize the relatively high light conducting efficiency optical fibers 10, in combination with a light controllable longitudinally dimensioned photoconductor 12, to provide extremely small diameter light amplifier control elements which make it possible to convert a light image of a given intensity to a light image of a greatly increased intensity with a high degree of resolution. The photoconductor 12 is disposed upon predetermined areas of the optical fiber whereby it will be permitted to function as an attenuator of relatively high voltages in its dark state, in combination with a portion thereof 12a, which is adapted to function as a small plate like electrode 12a in the process of subjecting a predetermined area of an electroluminescent layer 14 to the influence of an electrical potential. This small plate like electrode 12a, when exposed to light, will cooperate with a second electrode 16 in applying the influence of a voltage source 18 across the thickness dimension of the electroluminescent layer 14 causing an irradiation of secondary light rays therefrom. However, these secondary light rays from the layer 14 will be adequately shielded from the photoconductive material 12 by a light shield 20 to prevent any secondary illumination of the photoconductive material 12.

The light conducting optical fibers as used in this invention are often referred to as light pipes, or light guides. These fibers 10 are designed to have a predetermined index of refraction, a longitudinal dimension exceeding its cross sectional dimension, an outer surface along its longitudinal dimension, and first and second transverse ends. These fibers 10 are also clad in a light conducting jacket 11, having an index of refraction less than the index of refraction of the fibers 10. The jacket 11 is disposed upon and intimately joined to a predetermined portion of the outer surface of the fibers in each of the various embodiments of the invention. Jacketed fibers of this type make very efficient light conductors which can be drawn down to diameters of less than 0.001".

Referring now to FIGURE 1a an optical fiber 10 is shown to have a first transverse end 13, a second transverse end 15, and a light conducting jacket 11 extending from the first transverse end 13 along the outer surface 17 of the longitudinal dimension of the fiber 10 to a distance 19 from the first tarnsverse end 13, leaving an unjacketed portion of the outer surface 21. On the unjacketed portion 21 of the fiber 10, and also the second transverse end 15, there is deposited photoconductive material 12 which is intimately joined to the fiber 10. On the outer surface of the jacket 11 there is a layer 24 of electrically conductive material extending from the first transverse end 13 to the photoconductive material 12 to which the conductor 24 is operatively connected. FIGURE 1b, which is a cross section of FIGURE 1a through A—A, shows the fiber 10 to be surrounded by the jacket 11, and the latter surrounded by the conductor 24. FIGURE 1c, which is a cross section of FIGURE 1a through B—B, shows the fiber 10 to be surrounded by the photoconductor 12. On the first transverse end 13 there is a layer of light transparent electrically conductive material 26 which is connected to the conductor 24. Light entering the first transverse end 13 through the light transparent window 26 will be conducted the distance 19 through the fiber 10 by means of a series of internal reflections from the lower index light conducting jacket 11. Upon reaching that part of the fiber 10 which is intimately joined by the photoconductive material 12 the light will be absorbed by the photoconductor 12 to thereby make it electrically conductive.

An examination of the light amplifier element embodiment of FIGURE 1 will show that the diameter of the element, which is to a larger extent determined by the diameter of the fiber 10, may be as small as 0.001" in diameter, and the length may be independent of longitudinal length requirements of the photoconductor 12. If, for example, the length requirements of the photoconductor 12 is on the order of 0.020", it would be extremely difficult to assemble the elements in the form of a panel of this thickness. However, the panel thickness can be increased to a more practical dimension through the use of the conductor 24 which serves as a connection link between the photoconductor 12 and the window 26.

The small plate like area 12a of photoconductive material, which is a relatively small part of the longitudinally extended portion 12 deposited on the outer surface 21 of the fiber 10, has deposited thereon an opaque layer, or light shield 20, followed by an electroluminescent phosphor layer 14. On the outer surface of the phosphor layer 14 there is a layer of light transparent electrically conductive material 16. Interconnecting the layer 16 and the layer 26 is a voltage source 18, completing the circuit and light amplifier element.

Following the entry of light through the first transverse end 13 of the fiber 10 and the illumination of the photoconductive material 12 and 12a, the electroluminescent layer 14, containing electroluminescent phosphor particles in a dielectric media, will be subjected to the influence of voltage from the voltage source 18. The voltage, or electrical field, to which the layer 14 will be subjected will be established intermediate the photoconductor electrode 12a and the transparent electrode 16, causing an irradiation of light rays from the electroluminescent layer, which light rays will be visible through the transparent electrode 16.

From an electrical standpoint, upon the admission of light to the fiber 10 through the first transverse end 13, there will be a continuous circuit through the light amplifier element from the first electrode 26 to the second electrode 16. However, the light shield 20 intermediate the photoconductor 12a and the electroluminescent layer 14 serves as an effective means of preventing a feedback of light rays from the layer 14 to the photoconductive material 12 and 12a. By virtue of the light shield 20, in combination with the light controllable longitudinally dimensioned photoconductor 12, the picture-element-area photoconductor 12a, and the efficient light conducting fiber 10 and support means, various shades of gray, in relation to various degrees of light intensity, will be reproduced in the form of secondary light from the electroluminescent layer 14, in view of the fact that an otherwise disturbing light from layer 14 will be shielded from the photoconductive material 12. Any feed-back of light, of course, from the layer 14 to the material 12 would result in an elimination of all shades of gray in the secondary light. As a light amplifier, therefore, the invention is designed to receive and amplify relatively low levels of light over a wide range of intensities.

The photoconductor material of the first layer 12 and the second layer 12a may be of such materials as selenium, cadmium sulphide, silver selenide, or like materials, and the light transparent electrodes 16 and 26 are of a material known as "Nesa" transparent conductive material, produced by the Pittsburgh Plate Glass Company.

Although I have shown but one embodiment of the invention it should, of course, be understood that many of the other embodiments embracing the general principles of the constructions hereinbefore set forth may be utilized and still be within the ambit of the present invention.

The particular embodiment of the invention illustrated and described herein is illustrative only, and the invention includes such other modifications and equivalents as may readily appear to those skilled in the arts, and within the scope of the appended claims.

I claim:
1. Means for utilization in an image amplifying apparatus comprising:
   (a) a light conducting core having a predetermined index of refraction, a longitudinal dimension exceeding its cross sectional dimension, a first transverse end, a second transverse end and an outer surface extending from said first end to said second end along said longitudinal dimension;
   (b) a light conducting jacket having an index of refraction less than said predetermined index disposed upon a first portion of said outer surface of the core extending a predetermined distance from said first end;
   (c) a first layer of photoconductor material disposed upon a second portion of said outer surface of the core so as to provide a tubular photoconductor having a predetermined longitudinal dimension extending from said jacket along said second portion to said second end;
   (d) a second layer of photoconductor material disposed upon said second end and connected electrically with said first layer of photoconductor material;
   (e) electrically conducting material disposed upon said jacket so as to provide a tubular conductor between said first end and said tubular photoconductor and connected electrically with said tubular photoconductor adjacent said jacket;
   (f) said tubular conductor being adapted to extend a voltage to said tubular photoconductor; and
   (g) said jacket being adapted to control the reflection of light through said core to said first layer and to said second layer and prevent the absorbing of said light by said tubular conductor.

2. The invention as set forth in claim 1 additionally including:
   (h) a light transparent electrically conductive layer adjacent said second layer;
   (i) an electroluminescent layer intermediate said transparent conductive layer and said second layer; and
   (j) means for presenting a voltage between said tubular conductor and said transparent conductive layer and extending the influence of said voltage across said electroluminescent layer upon the reflection of light from said jacket to said first layer and said second layer.

3. The invention as set forth in claim 2 additionally including:
   (k) a layer of opaque material intermediate said electro-luminescent layer and said second layer to thereby prevent the exposure of said first layer and said second layer to light from said electroluminescent layer upon extending said influence across said electroluminescent layer.

References Cited by the Examiner

UNITED STATES PATENTS

| | | | |
|---|---|---|---|
| 2,839,690 | 6/58 | Kazan | 250—213 |
| 2,870,342 | 1/59 | Walker et al. | 250—213 |
| 3,050,623 | 8/62 | McNaney | 250—213 X |
| 3,056,031 | 9/62 | McNaney | 250—213 |
| 3,088,037 | 4/63 | Baum | 250—227 |
| 3,110,816 | 11/63 | Kaisler et al. | 250—227 |

OTHER REFERENCES

Brown et al.: Opaque Layer for Light Amplifiers, RCA Technical Notes, No. 209, Jan. 5, 1959.

Darling et al.: Solid State Storage Light Intensifier Panel, RCA Technical Notes, No. 368, June 10, 1960.

Orthuber et al.: A Solid-State Image Intensifier, reprinted from Journal of the Optical Society of America, vol. 44, No. 4, April 1954, pp. 297 to 299.

Schwarz: Electroluminescence X-Ray Intensifier, RCA Technical Notes, No. 315, Nov. 30, 1959.

RALPH G. NILSON, *Primary Examiner.*

ARCHIE R. BORCHELT, *Examiner.*